United States Patent [19]
Cohen et al.

[11] Patent Number: 5,736,473
[45] Date of Patent: Apr. 7, 1998

[54] FIBROUS COMPOSITE STRUCTURE INCLUDING PARTICULATES

[75] Inventors: Bernard Cohen, Berkeley Lake; Judith Katherine Faass, Dawsonville; Lamar Heath Gipson, Acworth; Lee Kirby Jameson, Roswell, all of Ga.

[73] Assignee: Kimberly-Clark Corp., Neenah, Wis.

[21] Appl. No.: 447,473

[22] Filed: May 23, 1995

Related U.S. Application Data

[62] Division of Ser. No. 306,034, Sep. 14, 1994, abandoned.
[51] Int. Cl.$^6$ .................................................... B32B 5/16
[52] U.S. Cl. .................... 442/239; 442/285; 442/268; 442/304; 442/382; 442/400; 428/323
[58] Field of Search .................................. 428/283, 240, 428/323, 903, 198; 442/237, 267, 285, 239, 304, 268, 382, 400

[56] References Cited

U.S. PATENT DOCUMENTS

| | | | |
|---|---|---|---|
| 3,919,437 | 11/1975 | Brown et al. | 427/202 |
| 3,998,988 | 12/1976 | Shimomai et al. | 428/400 |
| 4,427,712 | 1/1984 | Pan | 427/460 |
| 4,701,237 | 10/1987 | Lassen | 156/252 |
| 5,112,677 | 5/1992 | Tani et al. | 428/240 |
| 5,296,064 | 3/1994 | Muzzy et al. | 156/245 |
| 5,328,759 | 7/1994 | McCormack et al. | 428/283 |
| 5,364,657 | 11/1994 | Throne | 427/195 |
| 5,370,911 | 12/1994 | Throne et al. | 427/185 |
| 5,401,446 | 3/1995 | Tsai et al. | 264/22 |

FOREIGN PATENT DOCUMENTS

| | | |
|---|---|---|
| 3724804 | 2/1989 | Germany . |
| 930807 | 6/1986 | U.S.S.R. . |

*Primary Examiner*—James J. Bell
*Attorney, Agent, or Firm*—J. E. Ruland

[57] ABSTRACT

Disclosed is a method of attaching a substantially uniform distribution of particulates to individual exposed surfaces of a matrix of fibrous material. The method includes the following steps: 1) electrically charging a matrix of fibrous material having individual exposed surfaces to create a substantially uniform distribution of charged sites at the exposed surfaces; 2) applying particulates to the charged matrix of fibrous material so that at least some particulates adhere at the charged sites; and 3) attaching particulates adhering to the fibrous material at charged sites by substantially non-transient bonding. Also disclosed is a fibrous composite structure composed of a matrix of fibrous material having individual exposed surfaces; and a relatively uniform distribution of particulate material attached to individual exposed surfaces of the fibrous material by substantially non-transient bonding.

19 Claims, 10 Drawing Sheets

FIBROUS COMPOSITE STRUCTURE INCLUDING PARTICULATES

This application is a divisional of application Ser. No. 08/306,304 entitled "Method of Attaching Particulates to a Substrate and Article produced Thereof" and filed in the U.S. Patent and Trademark Office on Sep. 14, 1994, now abandoned.

FIELD OF THE INVENTION

The present invention relates to composite nonwoven materials and a method to make the same. More particularly, the present invention relates to sheet or web materials that incorporate particulate materials and a method to make the same.

BACKGROUND OF THE INVENTION

Sheet and/or web materials are widely used in many types of products such as, for example, personal care products, garments, medical fabrics and the like. Some sheets or webs made from certain inexpensive raw materials could have an even wider range of applications in these products if the sheets or webs could be designed to have enhanced properties or attributes.

For example, polyolefins are widely used in the manufacture of sheet or web materials. Polyolefin sheets or webs tend to be hydrophobic and relatively inert. In the past, topical or internal additives have been used with polyolefin fibers to impart desired functional characteristics to fibrous webs. For example, liquid coatings have been applied to sheets and/or webs. These coatings and internal additives have limits to the types of functional characteristics that can be economically imparted to sheets or webs.

Particulates (e.g., finely divided solid materials and/or short fibers) may be physically mixed with fibrous material to impart some desired characteristics to sheets or webs. The finely divided solids tend to form "clumps" within the "carrier" material (e.g., the sheet or web). It can be difficult to bond or otherwise securely fix finely divided solids in the unevenly distributed clumps to the carrier material. The clumps are often held in place by physical entrapment or entanglement and may disintegrate or release much solid materials if sufficiently disturbed. Bonding with heat or adhesives tends to fix only the clumps and may also fail to secure finely divided solids within the clumps.

Some materials such as, for example, some sandpapers and/or some flocked materials can be manufactured by grossly attaching particulates to a charged substrate. These materials can be characterized by a relatively thick layer of particulates joined to an adhesive which covers the exterior of a substrate. Such materials and processes are not directed to securing a relatively uniform distribution of particulates (e.g., finely divided solid materials and/or short fibers) to individual exposed surfaces (e.g., individual fiber surfaces) of relatively permeable sheets and/or webs.

Thus, there is a need for a practical process for securing a relatively uniform distribution of particulates (e.g., finely divided solid materials and/or short fibers) to individual exposed surfaces of sheets and/or webs (e.g., relatively permeable materials) by substantially non-transient bonding. There is also a need for a practical continuous process suitable for high-speed manufacturing processes that secures a relatively uniform distribution of particulates (e.g., finely divided solid materials and/or short fibers) to individual exposed surfaces of sheets and/or webs (e.g., relatively permeable materials) by substantially non-transient bonding.

Furthermore, there is a need for fibrous composite structure composed of a matrix of fibrous material having individual exposed surfaces substantially throughout the matrix and a relatively uniform distribution of particulate material attached to at least a portion of the individual exposed surfaces of the fibrous material by substantially non-transient bonding. There is also a need for a film-like composite structure composed of a apertured film-like material having individual exposed surfaces and a relatively uniform distribution of particulate material attached to at least a portion of the individual exposed surfaces of the apertured film-like material by substantially non-transient bonding.

DEFINITIONS

As used herein, the term "nonwoven web" refers to a web that has a structure of individual fibers or filaments which are interlaid, but not in an identifiable repeating manner. Nonwoven webs have been, in the past, formed by a variety of processes known to those skilled in the art such as, for example, meltblowing, spunbonding and bonded carded web processes.

As used herein, the term "spunbond web" refers to a web of small diameter fibers and/or filaments which are formed by extruding a molten thermoplastic material as filaments from a plurality of fine, usually circular, capillaries in a spinnerette with the diameter of the extruded filaments then being rapidly reduced, for example, by non-eductive or eductive fluid-drawing or other well known spunbonding mechanisms. The production of spunbonded nonwoven webs is illustrated in patents such as Appel, et al., U.S. Pat. No. 4,340,563; Dorschner et al., U.S. Pat. No. 3,692,618; Kinney, U.S. Pat. Nos. 3,338,992 and 3,341,394; Levy, U.S. Pat. No. 3,276,944; Peterson, U.S. Pat. No. 3,502,538; Hartman, U.S. Pat. No. 3,502,763; Dobo et al., U.S. Pat. No. 3,542,615; and Harmon, Canadian Patent No. 803,714.

As used herein, the term "meltblown fibers" means fibers formed by extruding a molten thermoplastic material through a plurality of fine, usually circular, die capillaries as molten threads or filaments into a high-velocity gas (e.g. air) stream which attenuates the filaments of molten thermoplastic material to reduce their diameters, which may be to microfiber diameter. Thereafter, the meltblown fibers are carried by the high-velocity gas stream and are deposited on a collecting surface to form a web of randomly disbursed meltblown fibers. The meltblown process is well-known and is described in various patents and publications, including NRL Report 4364, "Manufacture of Super-Fine Organic Fibers" by V. A. Wendt, E. L. Boone, and C. D. Fluharty; NRL Report 5265, "An Improved Device for the Formation of Super-Fine Thermoplastic Fibers" by K. D. Lawrence, R. T. Lukas, and J. A. Young; and U.S. Pat. No. 3,849,241, issued Nov.19, 1974, to Buntin, et al.

As used herein, the term "microfibers" means small diameter fibers having an average diameter not greater than about 100 microns (μm), for example, having a diameter of from about 0.5 microns to about 50 microns, more specifically microfibers may also have an average diameter of from about 1 micron to about 20 microns. Microfibers having an average diameter of about 3 microns or less are commonly referred to as ultra-fine microfibers. A description of an exemplary process of making ultra-fine microfibers may be found in, for example, U.S. Pat. Nos. 5,213,881 and 5,271,883, entitled "A Nonwoven Web With Improved Barrier Properties", incorporated herein by reference in their entirety.

As used herein, the term "thermoplastic material" refers to a high polymer that softens when exposed to heat and returns to its original condition when cooled to room temperature. Natural substances which exhibit this behavior are crude rubber and a number of waxes. Other exemplary thermoplastic materials include, without limitation, polyvinyl chloride, polyesters, nylons, polyfluorocarbons, polyethylene, polyurethane, polystyrene, polypropylene, polyvinyl alcohol, caprolactams, and cellulosic and acrylic resins.

As used herein, the term "apertured film-like material" refers to a generally flat or planar layer of material which has been punched, drilled, apertured, stretched, perforated, embossed, patterned, crinkled and/or otherwise processed so that it may have relatively gross or visible openings and/or a pattern or texture in the thickness dimension (i.e., Z-direction) of the material. Exemplary apertured film-like materials include, but are not limited to, perf-embossed films, textured apertured films, reticulated apertured films, contoured apertured films, film-nonwoven apertured laminates, and expanded plexi-filamentary films.

As used herein, the term "electrically charged sites at individual exposed surfaces" refers to locations of electrostatic charge on or beneath the surface of a dielectric material due to electret formation or by constant application of an electric field to the surface of a non-dielectric material.

As used herein, the term "sintering" refers to agglomeration of materials by heating to a temperature below the melting point. Generally speaking, when materials having different melting temperatures are sintered, they are heated to a temperature below the melting point of the highest melting-point material. According to the present invention, sintering may be carried out exclusively by application of heat or by combinations of heat and pressure. Under the present definition, sintering may be carried out independently of changes to the surface area of the material sintered.

As used herein, the term "superabsorbent" refers to absorbent materials capable of absorbing at least 10 grams of aqueous liquid (e.g. water, saline solution or synthetic urine Item No. K-C 399105 available from PPG Industries) per gram of absorbent material while immersed in the liquid for 4 hours and holding the absorbed liquid while under a compression force of up to about 1.5 pounds per square inch. As used herein, the term "consisting essentially of" does not exclude the presence of additional materials which do not significantly affect the desired characteristics of a given composition or product. Exemplary materials of this sort would include, without limitation, pigments, antioxidants, stabilizers, surfactants, waxes, flow promoters, particulates or materials added to enhance processability of a composition.

SUMMARY OF THE INVENTION

The present invention responds to the needs described above by providing a method of attaching a substantially uniform distribution of particulates to individual exposed surfaces of a matrix of fibrous material (e.g., individual fiber surfaces). The method includes the following steps: 1) electrically charging a matrix of fibrous material having individual exposed surfaces to create a substantially uniform distribution of charged sites at the individual exposed surfaces; 2) applying particulates to the charged matrix of fibrous material so that at least some particulates adhere at the charged sites; and 3) attaching particulates adhering to the fibrous material at charged sites by substantially non-transient bonding.

The electrical charge may be an electrostatic charge applied to a matrix of dielectric fibrous material by passing the matrix of fibrous material through a high voltage field. Alternatively and/or additionally, the electrical charge may be an electric field applied directly to a matrix of non-dielectric fibrous material.

According to the invention, the substantially uniform distribution of charged sites may be created on individual exposed surfaces of fibrous material (e.g., individual fiber surfaces) substantially throughout the matrix. In an aspect of the invention, the substantially uniform distribution of charged sites may be created on individual exposed surfaces of fibrous material over only a portion of the matrix.

Generally speaking, particulates can be applied to the charged matrix of fibrous material by contact between the charged matrix of fibrous material and particulates suspended in a moving gas. For example, particulates may be applied to the charged matrix of fibrous material by contact between the charged matrix of fibrous material and a fluidized bed of particulates.

A charge may be applied to or removed from the particulates prior to contact with the charged matrix of fibrous material. The charge may neutralize an inherent charge on the particulates or may be designed to create a charge on the particulates that is generally opposite the charge on the matrix of fibrous material.

The method of the present invention may include the step of removing excess particulates from the charged matrix of fibrous material. Generally speaking, this can occur prior to the step of non-transiently bonding the particulates to the fibrous material.

In one aspect of the invention, layers of particulates may be attached to the matrix of fibrous material. For example, the method of the present invention may include the steps of: A) recharging the matrix of fibrous material after an application of particulates to create a substantially uniform distribution of charged sites at individual exposed surfaces and adhered particulates; and B) applying particulates to the charged matrix of fibrous material and adhered particulates so that at least some particulates adhere at the charged sites. The particulates applied to the recharged matrix of fibrous material may be the same as or different from the previously adhered particulates.

According to the invention, the particulates adhering to the fibrous material at charged sites may be attached by substantially non-transient bonding produced by bonding techniques using, for example, heat, adhesives, chemical reaction and/or interfacial energy between particulate surfaces and the surfaces of fibrous material.

When heat-bonding is utilized, heat may be supplied by means such as, but not limited to, infra-red radiation, steam cans, hot ovens, microwaves, flame, hot gases, hot liquid, and radio frequency heating.

The present invention encompasses a method of attaching a substantially uniform distribution of particulates to individual exposed surfaces of a film-like material (e.g., individual film-like surfaces). The method includes the following steps: 1) electrically charging an apertured film-like material having individual exposed surfaces to create a substantially uniform distribution of charged sites at individual exposed surfaces; 2) applying particulates to the charged apertured film-like material so that at least some particulates adhere at the charged sites; and 3) attaching particulates adhering at charged sites by substantially non-transient bonding.

Generally speaking, the method of attaching a substantially uniform distribution of particulates to individual exposed surfaces of a film-like material may have the parameters described above for the method of attaching a substantially uniform distribution of particulates to individual exposed surfaces of a matrix of fibrous material. As an example, the method of the present invention may include the steps of: A) recharging the apertured film-like material after an application of particulates to create a substantially uniform distribution of charged sites at individual exposed surfaces and adhered particulates; and B) applying particulates to the charged apertured film-like material and adhered particulates so that at least some particulates adhere at the charged sites. The particulates applied to the recharged film-like material may be the same as or different from the adhered particulates.

The present invention also encompasses a fibrous composite structure composed of a matrix of fibrous material having individual exposed surfaces; and a relatively uniform distribution of particulate material attached to individual exposed surfaces of the fibrous material (e.g., individual fiber surfaces) by substantially non-transient bonding.

The matrix of fibrous material may be selected from woven fabrics, knit fabrics and nonwoven fabrics. The nonwoven fabrics may be selected from nonwoven webs of meltblown fibers, nonwoven webs of continuous spun-bonded filaments, and bonded carded webs. In one aspect of the invention, matrix of fibrous material may further include one or more entangled or entrapped secondary materials. As an example, a nonwoven web of meltblown fibers may also include materials such as, for example, textile fibers, wood pulp fibers, particulates and/or super-absorbent materials.

The fibrous material may be selected from thermoplastic polymer fibers and thermoplastic polymer filaments. If the fibrous material is made of a thermoplastic polymer, the thermoplastic polymer may be a polymer selected from polyolefins, polyamides and polyesters. If polyolefins are used, they may be, for example, polyethylene, polypropylene, polybutene, ethylene copolymers, propylene copolymers, and butene copolymers and blends of the same. According to the invention, at least a portion of the fibrous material may be a bi-component fibrous material such as, for example, bi-component fibers and bi-component filaments.

The particulate material may have an average size of from about 0.1 micron ($\mu$m) to about 400 microns. For example, the particulate material may have an average size of from about 0.5 micron to about 200 microns. As a further example, the particulate material may have an average size of from about 1 micron to about 100 microns. In an embodiment of the invention, the particulate material may have an average size that is about the same as the average diameter of the fibrous material. Desirably, the particulate material has an average size which is less than the average diameter of the fibrous material. In another embodiment of the invention, the particulate material may have an average size which is from about 0.1 to about 0.001 times the average diameter of the fibrous material. In an embodiment of the invention, it is desirable for the particulate material to have an average size ranging from about 0.1 micron to about 5 microns. For example, the particulate material may have an average size of from about 0.5 micron to about 2 microns. As a further example, the particulate material may have an average size of from about 0.5 micron to about 1 micron.

The particulate material may be selected from inorganic solids, organic solids, modified pulps and spores and mixtures of the same. Exemplary inorganic solids include silicas, metals, metal complexes, metal oxides, zeolites and clays. Exemplary organic solids include activated carbons, activated charcoals, molecular sieves, polymer microsponges, polyacrylates, polyesters, polyolefins, polyvinyl alcohols, and polyvinylidine halides. Exemplary modified pulps include microcrystalline cellulose, highly refined cellulose pulp, and bacterial cellulose.

According to the invention, the fibrous composite structure may have a basis weight of from about 6 to about 400 grams per square meter.

The present invention also encompasses a multilayer material composed of at least two layers of the fibrous composite structure. In yet another aspect of the present invention, the multilayer material may be composed of at least one layer of the fibrous composite structure and at least one other layer. The other layer may be, for example, woven fabrics, knit fabrics, bonded carded webs, continuous spunbond filament webs, meltblown fiber webs, films, apertured film-like materials, and combinations thereof.

The present invention further encompasses a film-like composite structure composed of an apertured film-like material having individual exposed surfaces; and a relatively uniform distribution of particulate material attached to exposed surfaces of the apertured film-like material (e.g., individual film-like surfaces) by substantially non-transient bonding.

The apertured film-like material may be selected from, for example, perf-embossed films, textured apertured films, reticulated apertured films, contoured apertured films, film-nonwoven apertured laminates, and expanded plexi-filamentary films.

Generally speaking, the apertured film-like material may include one or more secondary materials. The apertured film-like material may be formed from a thermoplastic polymer. The thermoplastic polymer may be selected from, for example, polyolefins, polyamides and polyesters. The polyolefin may be, for example, polyethylene, polypropylene, polybutene, ethylene copolymers, propylene copolymers, and butene copolymers and blends of the same.

In an aspect of the invention, the film-like composite structure may have a basis weight of from about 6 to about 400 grams per square meter. The present invention encompasses a multilayer material composed of at least two layers of the film-like composite structure. The present invention also encompasses a multilayer material composed of at least one layer of the film-like composite structure and at least one other layer. The other layer may be, for example, any suitable woven fabrics, knit fabrics, bonded carded webs, continuous spunbond filament webs, meltblown fiber webs, films, apertured film-like materials, and combinations thereof.

DETAILED DESCRIPTION OF THE INVENTION

Figure 1:
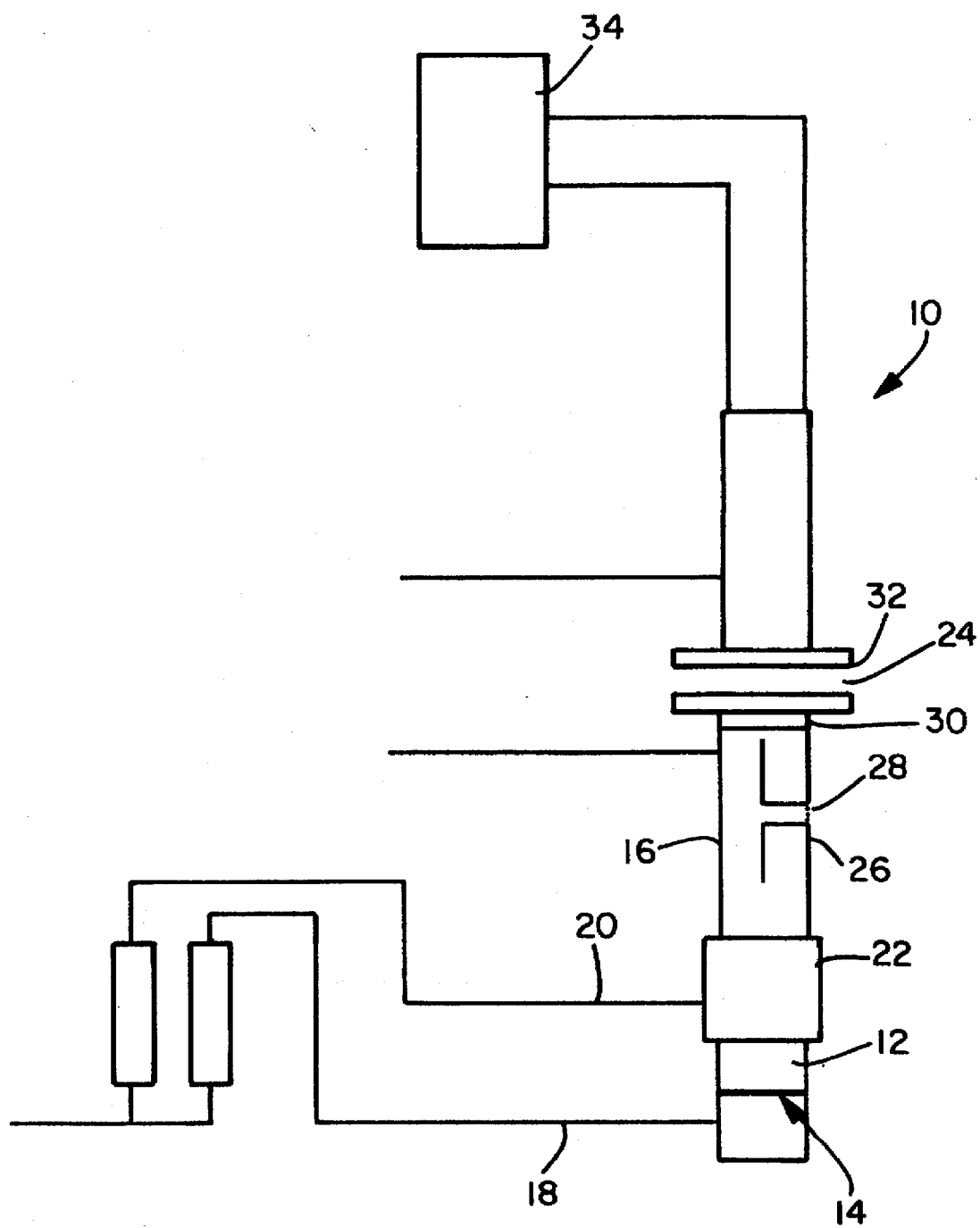
FIG. 1 is an illustration of an exemplary method for attaching a substantially uniform distribution of particulates to individual exposed surfaces of a permeable material.

Referring to the drawing and in particular to FIG. 1, there is shown, not necessarily to scale, at 10 an exemplary method of attaching a substantially uniform distribution of particulates to individual exposed surfaces of a permeable material (e.g., a matrix of fibrous material).

According to the invention, a finely divided solid material (i.e., particulates or fine fibers) 12 is placed on a screen 14 in a fluidization chamber 16. A gas under pressure enters the chamber under the screen 12 via a primary air supply 18. The primary gas supply 18 entrains the particulates 12 creating a suspension of particulates 12 (e.g., particulate cloud) in the chamber. A boost gas supply 20 which enters the chamber 16 through a flow amplifier 22 above the screen 14 may be used to lift (boost) the suspension of particulates 12 (particulate cloud) toward the permeable material 24. If necessary, one or more boost gas supplies may be used. The primary and boost gases should be relatively dry and may be, but are not limited to, air, carbon dioxide, nitrogen and the like.

A permeable material 24 to be treated is located at the top of the chamber 16 and is held in place by a bracket.

Generally speaking, the permeable material 24 should be permeable enough to allow a sufficient flow of gas to maintain a gas-borne suspension of particulates in the chamber (i.e., allow operation of the fluidized bed). For example, and without limitation, the permeable sheet may have a permeability of about 10 cfm/ft$^2$, as measured for a substantially dry sheet prior to processing. As another example, the permeable sheet may have a permeability of 20 to over 200 cfm/ft$^2$, as measured for a substantially dry sheet prior to processing.

The permeable material 24 should have individual exposed surfaces. For example, if the permeable material is a matrix of fibrous material, it should have individual exposed surfaces of fibrous material. A suitable matrix of fibrous material may be selected from, for example, woven fabrics, knit fabrics and nonwoven fabrics. The nonwoven fabrics may be selected from nonwoven webs of meltblown fibers, nonwoven webs of continuous spunbonded filaments, and bonded carded webs. As another example, if the permeable material 24 is an apertured film-like material, it should have individual exposed surfaces of apertured film-like material. A suitable apertured film-like material may be selected from, for example, perf-embossed films, textured apertured films, reticulated apertured films, contoured apertured films, film-nonwoven apertured laminates, and expanded plexi-filamentary films.

According to the invention (but not necessarily as shown in FIG. 1), the permeable material 24 is electrically charged. If the permeable material 24 is a dielectric, this may be accomplished by passing the material through a high voltage electric field to form an electret or electrical charge which persists at least until the non-transient bonding occurs. Generally speaking, techniques for charging nonconductive webs are known. These methods include, for example, thermal, liquid-contact, electron beam and corona discharge methods. For example, corona discharge charging of nonconductive webs is described in U.S. Pat. No. 4,588,537, the contents of which regarding the charging of webs is herein incorporated by reference. As another example, charging of nonconductive webs between the surface of a grounded metal electrode and a series of discharge electrodes is described in U.S. Pat. 4,592,815, the contents of which regarding the charging of webs is herein incorporated by reference.

One technique of interest involves applying high voltage electric fields via direct current (i.e., DC) to form an electret. This "cold-charging" technique is described in U.S. patent application Ser. No. 07/958,958 filed Oct. 9, 1992, assigned to the University of Tennessee, and is herein incorporated by reference. Generally speaking, the technique involves subjecting a material to a pair of electrical fields wherein the electrical fields have opposite polarities. For example, the permeable material may be charged by sequentially subjecting the material to a series of electric fields such that adjacent electric fields have substantially opposite polarities with respect to each other. Thus, one side of the permeable material is initially subjected to a positive charge while the other side of the permeable material is initially subjected to a negative charge. Then, the first side of the permeable material is subjected to a negative charge and the other side of the permeable material is subjected to a positive charge.

It is important to note that the terms "positive" and "negative" are meant to be relative terms. For example, a pair of electrodes will have a positive electrode and a negative electrode any time there is a difference in potential between the two electrodes. In general, the positive electrode will be the electrode with the more positive (or less negative) potential, while the negative electrode will be the electrode with the more negative (or less positive) potential.

The strength of the electric field used to charge the permeable material may vary and can be appropriately determined by those of ordinary skill in the art. Generally speaking, the permeable material may be subjected to electric fields which are between about 1 kVDC/cm and about 12 kVDC/cm. For example, electrical fields between about 5 kVDC/cm and 7.5 kVDC/cm have been found to be suitable.

Once the permeable material 24 has been formed into an electret, the material could have an overall positive (+) charge, an overall negative (−) charge, a positive (+) charge at one surface and a negative (−) charge at an opposite surface, various other combinations of charges distributed over the permeable material.

If the permeable material is a dielectric, it may be prepared from nonconductive polymeric material such as, for example, polyolefins, polyamides, polyesters and polycarbonates. The polyolefins may be, for example, polyethylene, polypropylene, polybutene, ethylene copolymers, propylene copolymers, and butene copolymers and blends of the same. Additionally, the permeable material may be a composite containing both conductive and nonconductive material. For example, if the permeable material is a fibrous material, it may be a composite including materials such as meltblown/cotton/meltblown thermally bonded webs or meltblown/cotton hydroentangled or needle-punched webs, hydroentangled mixtures of staple fibers and pulp, hydroentangled mixtures of continuous filaments and pulp, coformed webs, films, and the like.

If the permeable material 24 is non-dielectric, imparting an electrical charge to the permeable material can be accomplished by applying an electrical field to the permeable material. This may be done by a conductive ring or other suitable contact. For example, if the chamber 16 is cylindrical, a conductive ring 32 (e.g., a brass ring) may be placed against the permeable material 24 located at the top of the chamber 16. A direct current (i.e., DC) is applied between the ring and the electrode 28 to impart a temporary electrical charge to the web. The voltage may be either positive (+) or negative (−).

Although the inventor should not be held to a particular theory of operation, electrically charging the permeable material 24 is believed to create a substantially uniform distribution of charged sites at individual exposed surfaces of the permeable material. For example, if the permeable material 24 is a matrix of fibrous material, electrically charging the matrix of fibrous material should create a substantially uniform distribution of charged sites at individual exposed surfaces of the fibrous material. As another example, if the permeable material is an apertured film-like material, electrically charging the apertured film-like material should create a substantially uniform distribution of charged sites at individual exposed surfaces of the apertured film-like material.

The permeable material 24 charged as described above is placed at the top of the chamber 16 (e.g., a fluidized bed chamber) and is held in place by a bracket. The primary gas supply 18 is started so that particulates 12 are suspended in a gas stream (not shown). The primary gas supply 18 and, if necessary, the boost gas supply 20, is adjusted using the flow amplifier 22 so that the gas stream carries particulates 12 up toward the permeable material 24.

If desired, the particulates 12 may be electrically charged by way of an electrode system composed of an electrode 28 and a grounded metal band 30 (e.g., a conductive tape at ground potential) prior to contacting the permeable material 24. The grounded metal band 30 is located just below the bracket (not shown) which holds the permeable material in place. If a charge is applied to the particulates 12, the charge is desirably the opposite of the charge on the permeable material 24. However, if both positive and negative charges are present on the permeable material (e.g., if the permeable material has a positive charge on one side and a negative charge on the opposite side), the particulates may have either charge. As a practical matter, the particulates 12 should have a charge that permits them to contact and adhere to the portions of the permeable material where the particulates are desired.

Some particulates tend to have an inherent positive or negative charge. Such an inherent charge may be substantially neutralized by passing the particulates through an electrical field provided by an electrode system composed of an AC (alternating current) electrode 26 and the grounded flow amplifier 22 (i.e., the flow amplifier at ground potential). For example, if particulates tend to have an inherent positive charge or even a mixed charge, the particulates may be passed through an alternating voltage field (via electrode 26 and grounded flow amplifier 24)) so that the particulates 12 are electrically neutral as the gas stream carrying the particulates passes towards and through the permeable material.

The strength of the electric field used to charge the particulates suspended in the gas stream may vary and can be appropriately determined by those of ordinary skill in the art. Generally speaking, the particulates may be subjected to electric fields which are between about 1 kVDC/cm and about 12 kVDC/cm. For example, electrical fields between about 5 kVDC/cm and 7.5 kVDC/cm have been found to be suitable.

The electrically charged permeable material 24 held in place by a bracket directly at the top of the chamber 16 is exposed to particulates 12 (which may or may not be electrically charged) that are suspended in a moving gas so that at least some particulates 12 adhere to the permeable material 24 at charged sites. The method of the present invention should not be limited only to exposure or application of particulates 12 suspended in a moving gas (e.g., using fluidized bed techniques). Particulates may be applied to the electrically charged permeable material 24 using other techniques such as, for example, spraying, gravity deposition, and the like.

Particulates which come into contact with the electrically charged permeable material 24 generally adhere to the material at the charged sites. Excess particulates are carried off by the gas stream and may be recirculated or collected in a trap. Successive contacts or exposures of the particulates with the electrically charged permeable material 24 may be carried out so that layers of particulates may be adhered to the material at charged sites. Alternatively and/or additionally, the material may be electrically re-charged prior to being re-exposed or re-contacted with particulates.

Although the inventors should not be held to any particular theory of operation, it is thought that a substantially uniform distribution of charged sites at individual exposed surfaces of the permeable material promotes and enhances the uniform distribution of particulate material on the individual exposed surfaces. As the particulates become attracted to and adhere to the charged sites, the particulates are either oppositely charged or induce an opposite charge in reference to the charged site. In some instances, it is possible for both positive and negative charges to be induced at opposite portions of a particulate adhering to a charged site. For example, if the charged site on the permeable material has a negative (−) charge, the portion of the particulate nearest the charged site may have an positive (+) charge and the portion of the particulate farthest from the charged site may have an induced negative (−) charge. Thus, if the particulates generally have an overall positive (+) charge, a different particulate may be attracted to and actually adhere to the negative (−) charge on the first particulate. It is thought that the charge transfer weakens as more particulates stack upon each other.

This stacking phenomena tends to occur more frequently with smaller particulate materials and relatively less frequently with larger particulate materials. Some stacked particulates are succeptable to being shaken loose or detached. This may due to weakening or dissipation of the charge transfer between stacked particulates. Generally speaking, it is desirable to remove excess electrostatically adhered particulates from the permeable material using physical force or a removal technique. For example, the permeable material may be shaken, blown, brushed, vacuumed or the like.

After being adhered to the permeable material by electrostatic forces, the particulates are attached to individual exposed surfaces of the permeable material by substantially non-transient bonding. This step is considered important because the electrostatic forces can be temporarily overcome by physical forces (e.g., handling or by contact with aqueous solutions). The substantially non-transient bonding may be accomplished by any technique which generally fixes the particulates to individual exposed surfaces of the permeable material, either as coherent particulates or as a generally uniform coating created by melting or modifying the particulates.

Particulates adhering to the permeable material at charged sites may be attached by substantially non-transient bonding using heat. Sufficient heat to accomplish substantially non-transient bonding may be supplied by methods such as, for example, infra-red radiation, steam cans, hot ovens, microwaves, flame, hot gases, hot liquid, radio-frequency heating and combinations thereof.

Particulates adhering to the permeable material at charged sites can be attached by substantially non-transient bonding using adhesives. Adhesives may be applied to the permeable material prior to application of the particulates. Alternatively and/or additionally, adhesives may be applied to the permeable material after application of the particulates. Adhesives may be incorporated into the permeable material or into the particulates. Combinations of heat and adhesives may be used. For example, heat activated adhesives may be used to accomplish the substantially non-transient bonding. Particulates adhering to the permeable material at charged sites can be attached by substantially non-transient bonding due to chemical reaction between the particulate and the fibrous material.

Particulates adhering to the permeable material at charged sites can be attached by substantially non-transient bonding caused by interfacial energy between the particulate surfaces and the surfaces of fibrous material. For example, certain types of superabsorbent particulate material appear to become substantially non-transiently bonded to individual exposed surfaces of the permeable material after initially adhering to the surface at the charged sites.

Figure 2:
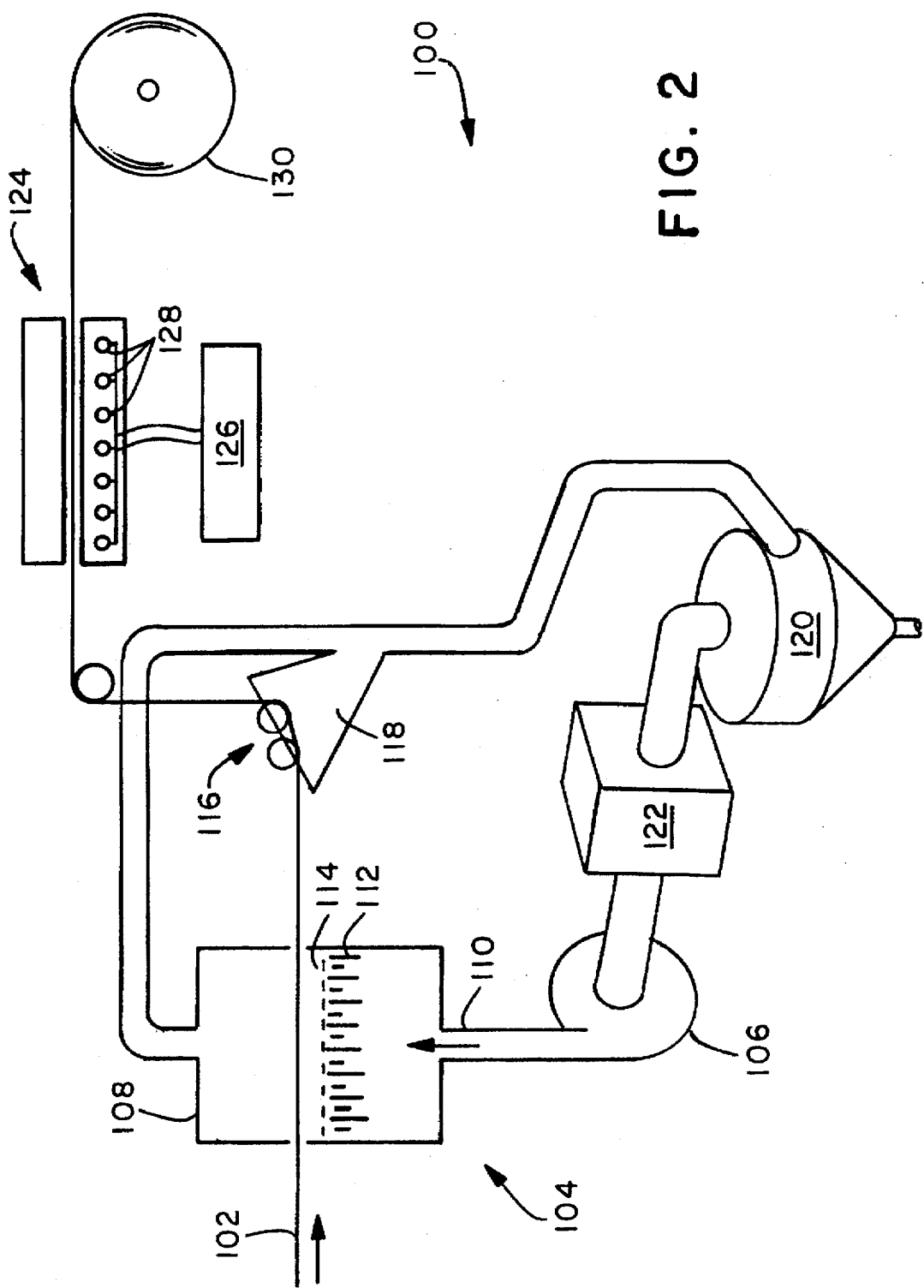
FIG. 2 is an illustration of an exemplary continuous method for attaching a substantially uniform distribution of particulates to individual exposed surfaces of a permeable material.

Referring now to FIG. 2 of the drawings, there is illustrated at 100 (not necessarily to scale) an exemplary continuous process or method for attaching a substantially uniform distribution of particulates to individual exposed surfaces of a permeable material. An electrically charged permeable material 102 (e.g., an electret nonwoven fibrous web) is introduced into a fluidizer/coating chamber 104 and passes through the fluidizer/coating chamber 104 in the general direction of the arrows associated therewith. A ring compressor 106 provides fluidizing air to fluidizing/coating chamber 104 which includes a rectangular gas-tight housing 108, and other components shown in more detail in FIG. 3. Gas enters a gas inlet opening 110 in the general direction of the arrow associated therewith and passes through a flow straightener 112 and a fluidized bed screen 114. The system may be operated at gas flow rates and pressures readily determined by one of ordinary skill in the art. Particulates may be continuously introduced onto the fluidized bed screen 114 using a conveyor system, pneumatic particulate handling system or the like.

Gas flow through the fluidized bed screen 114 fluidizes the solid particulate material (not shown), which may or may not be electrically charged, and causes particulates to come into close proximity or contact with the electrically charged permeable material 102. At least a portion of the particulates adhere to the electrically charged permeable material 102 at charged sites at individual exposed surfaces that are present in a relatively uniform distribution over the charged portions of the permeable material. Particulate material adheres in a relatively uniform distribution to the charged sites due to electrostatic forces.

The electrically charged permeable material 102 and adhered particulates (not shown) are transported out of the fluidizing/coating chamber 104. The electrically charged permeable material 102 with adhered particulate material is introduced to eccentric rollers 116 which shake off excess particulate material into a catch tray 118. It should be understood that eccentric rollers are only one of many possible ways to remove excess particulate material. Excess particulate material is conveyed to a cyclone separator 120 while gas proceeds through a filter 122 to the inlet of the ring compressor 106. Particulate material still attached to the electrically charged permeable material 102 after shake-off through the eccentric rollers 116 proceeds to a radio frequency heater 124 where the radio frequency field generated by a power converter 126 is radiated into the particulate material on the electrically charged permeable material 102 by antenna rods 128. Radio frequency energy heats the particulate material causing it to heat the permeable material 102. The heated particulate material melts or softens the permeable material 102 at or about the point of contact so that the permeable material becomes non-transiently bonded or fused with the particulate material. In an embodiment of the invention, the permeable material may have a coating of hot melt adhesive or similar material such as poly (ethylene-vinyl acetate) which becomes activated during heating. For example, if the permeable material is a apertured film-like material, it may have a thin coating of a hot melt adhesive or similar material.

The non-transient bonding mechanism described above is intended to be exemplary and not limiting. Other bonding mechanisms or types of bonding may be used. For example, the particulate material itself may become softened by the heating so that it softens to fuse with or even coat at least portions of the permeable material. Desirably, the particulate material may be adapted to soften and fuse with and/or coat the permeable material at individual exposed surfaces where it adheres. The permeable material 102, thus treated, can be wound into a roll 130 and stored or introduced directly into other converting operations to make desired products.

Figure 3:
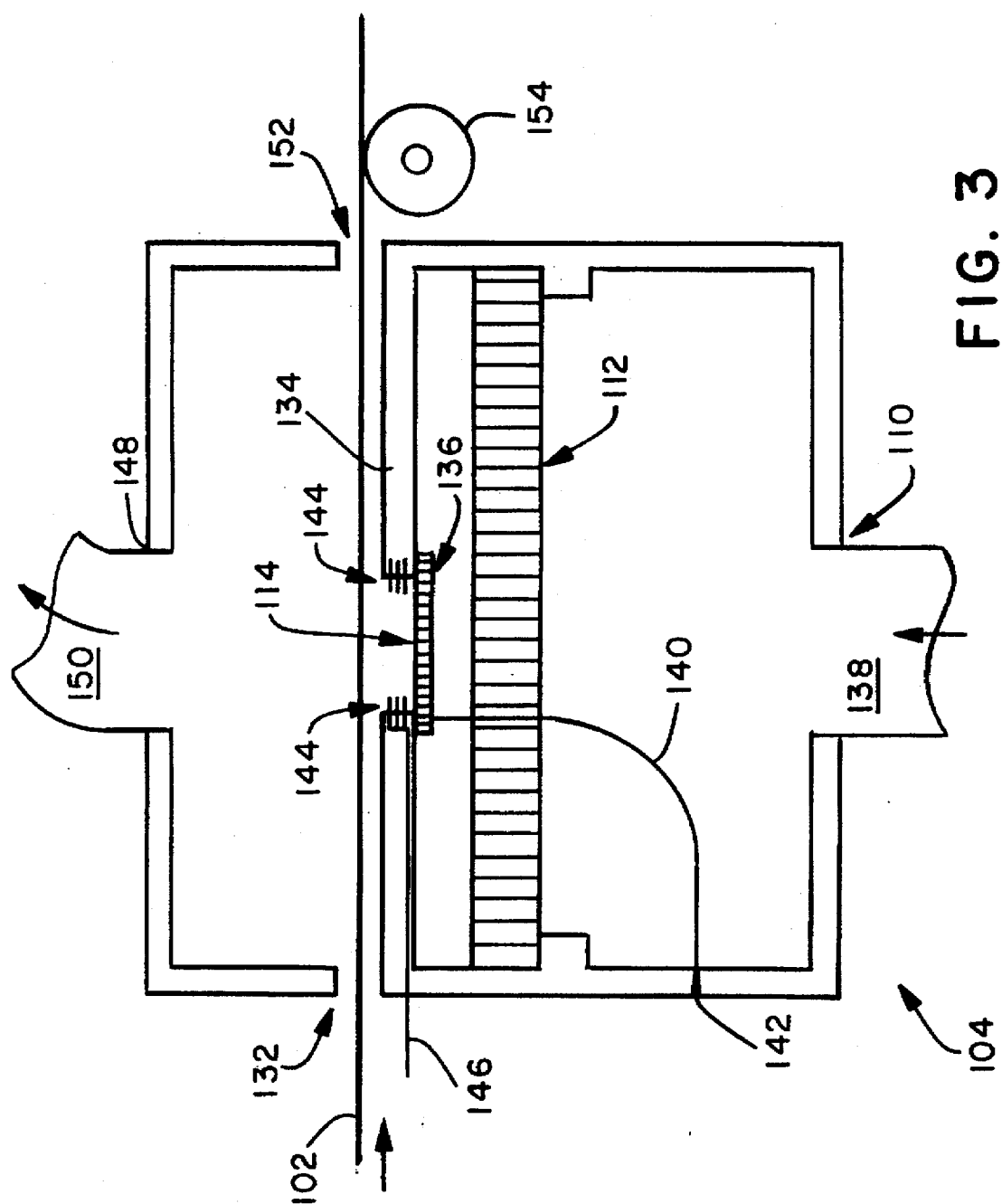
FIG. 3 is an illustration of a portion of an exemplary continuous method for attaching a substantially uniform distribution of particulates to individual exposed surfaces of a permeable material.

FIG. 3 shows detail (not necessarily to scale) of the fluidizer/coating chamber 104 (in FIG. 2). The electrically charged permeable material 102 emerges from the electret charger system (not shown) and enters the fluidizer/coater chamber 104 through a slot 132. A slotted box top baffle 134 supports and locates an interchangeable fluidizer screen 114 by way of a retaining bracket 136. Exemplary fluidizer screens may be sintered metal screens having micron-sized opening. For example, useful fluidizer screens include 5, 10 and 20 micron (μm) pore size sintered metal screens available from Memtec American Corporation of Deland, Fla. Gas emerging from ring compressor 104 (FIG. 1) enters the fluidizer/coater chamber 104 through a hose 138 via inlet 110. The gas passes through the flow straightener 112 which may be, for example, a plastic honeycomb or similar flow straightener which could be selected by one of ordinary skill in the art. For example, an experimental setup used a flow straightener which was selected for the dimensions of the fluidizer/coater chamber 104 measured about 17 inches by 5 inches by about 1 inch in thickness with parallel honeycomb flow-straightening cells of about 3/16 inches in diameter. Gas leaving the flow straightener 112 passes through the fluidizer screen 114 levitating the solid particulate material to be adhered onto the electrically charged permeable material. Agglomeration of the solid particulate material is prevented by adding microscopic bronze beads (not shown) from TSI Corporation, St. Paul, Minn., to the powder, the beads serving to keep any clumps of particulate material broken up. Levitated (e.g., fluidized) particulate material is put into the proximity of or contacted with the electrically charged permeable material 102 and is attracted to and adheres to the permeable material due to the electrostatic charges present in the permeable material and/or the particulate material.

Because some particulate materials may have an inherent charge that is the same type or similar to the electrically charged permeable material 102 and would thus be generally repelled instead of attracted, the metal fluidizer screen 114 is provided with wire or lead 140 joined to a connector 142 so that the screen may be grounded, brought to a neutralizing or an opposite potential, as required, so that the fluidized particulate material adheres to the electrically charged permeable material 102. Alternatively and/or additionally, an array of electrical charging needles 144 may be disposed along the inner walls of the trough or opening (or multiple troughs or openings) in a baffle 134. The electrical charging needles 144 are connected to wires 146 so that a potential applied to the needles 144 alone or in conjunction with the potential applied to the fluidizing screen 114 will cause the particulate material to charge to a polarity that is generally neutral or even opposite the charge on the electrically charged permeable material 102 so that particulate material electrostatically adheres to charged sites: at individual exposed surfaces of the permeable material 102.

Gas and stray particulate material flows through electrically charged permeable material 102 up through a port 148 and a hose 150 in the general direction of the arrows associated therewith and on toward the cyclone filter 120 (FIG. 1) to be recirculated.

The permeable material 102 and adhered particulate material proceeds out of the fluidizer/coater chamber 104 through a slot 152 and over a roller 154 on its way to the eccentric rollers 116 (FIG. 1) and to radio frequency heater 124 (FIG 1).

Figure 4:
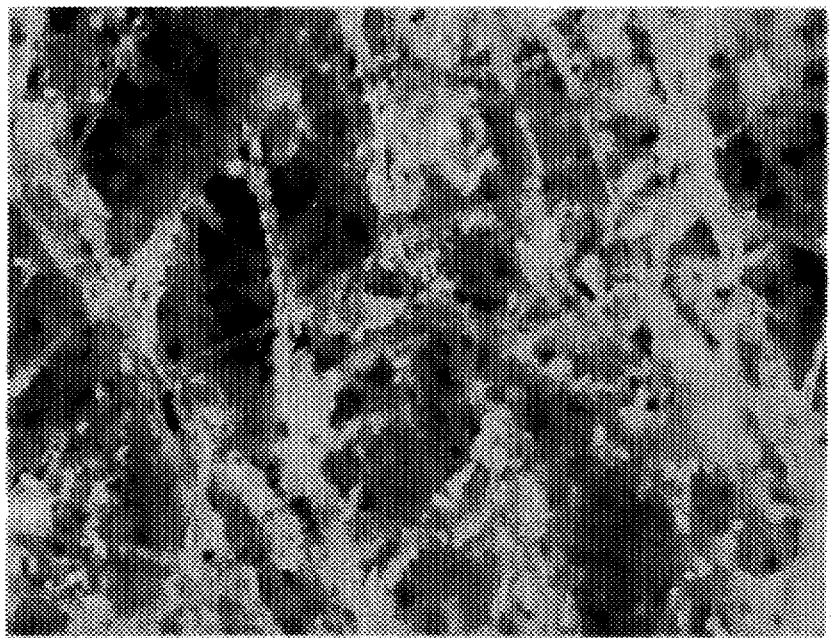
FIG. 4 is a microphotograph of an exemplary fibrous composite structure composed of a matrix of fibrous material having exposed surfaces and a relatively uniform distribution of particulates upon the exposed surfaces.

An important feature of the present invention is that a relatively uniform distribution of particulates adhere to the permeable material. Referring now to FIG. 4, there is shown a 51× (linear magnification) microphotograph (Olympus BH2 microscope) of an exemplary fibrous composite structure composed of a matrix of fibrous material having exposed surfaces and a relatively uniform distribution of particulates upon the exposed surfaces. FIG. 4 is a microphotograph of the material in Table 5 identified as "Sample 5". More particularly, FIG. 4 shows a matrix of bicomponent spunbond filaments. The matrix was electrically charged and cellulose particulates having an average size of about 100 microns were applied to the matrix utilizing a fluidized bed. The matrix containing adhered cellulose particulates was washed by dipping in water three times. The water wash helps remove unattached particulate material from the matrix. After washing, it could be seen that the particulates were bonded in a relatively uniform distribution to individual exposed surfaces of the filaments. The cellulose particulates adhered tightly to the individual exposed surfaces. It is believed that the bonding may be due to interfacial energy between the particulates and the surfaces of the filaments.

Figure 5:
FIG. 5 is a microphotograph of an exemplary fibrous composite structure containing a matrix of fibrous material and a relatively gross physical entrapment/deposition of particulates in portions of the matrix (i.e., clumps of particulates).

Referring now to FIG. 5, there is shown a 51× (linear magnification) microphotograph of an exemplary fibrous composite structure containing a matrix of fibrous material and a relatively gross physical entrapment/deposition of particulates in portions of the matrix (i.e., clumps of particulates). FIG. 5 is a microphotograph of the material in Table 5 identified as "Sample 71". More particularly, FIG. 5 shows a matrix of bicomponent spunbond filaments. The matrix was not an electret and no electrical charge was applied to the matrix during exposure to the particulates. Cellulose particulates having an average size of about 100 microns were applied to the matrix utilizing a fluidized bed. Particulates became physically caught/entrapped or otherwise grossly deposited at portions of the matrix. The matrix containing the physically entrapped/grossly deposited cellulose particulates was washed by dipping in water three times. As can be seen from FIG. 5, little, if any, particulates adhere to individual exposed surfaces of the filaments. Importantly, no relatively uniform distribution of particulates on individual exposed surfaces of the filaments is apparent.

Figure 6:
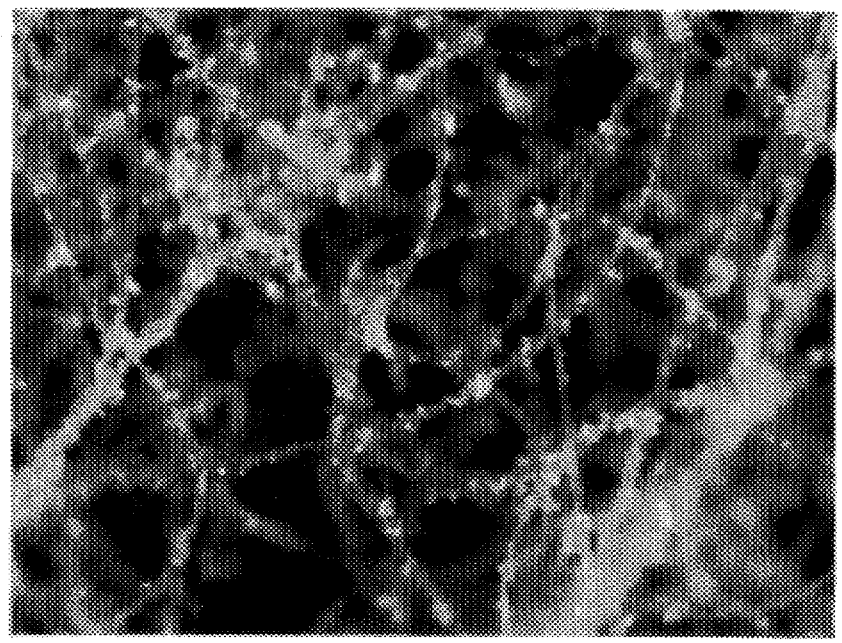
FIG. 6 is a microphotograph of an exemplary fibrous composite structure composed of a matrix of fibrous material having exposed surfaces and a relatively uniform distribution of particulates upon the exposed surfaces.

Referring now to FIG. 6, there is shown a 51× (linear magnification) microphotograph of an exemplary fibrous composite structure composed of a matrix of fibrous material having exposed surfaces and a relatively uniform distribution of particulates upon the exposed surfaces. FIG. 6 is a microphotograph of the material in Table 3 identified as "Sample 1". More particularly, FIG. 6 shows a matrix of bicomponent spunbond filaments. The matrix was electrically charged and starch-grafted sodium polyacrylate particulates having an average size ranging from about 50 microns to about 600 microns were applied to the matrix utilizing a fluidized bed. The particulates adhered to charged sites at a relatively uniform distribution on individual exposed surfaces of the filaments. The matrix containing adhered sodium polyacrylate particulates was sintered to cause a low melting-point component of the bicomponent spunbond filaments to fuse with the sodium polyacrylate. After sintering, it could be seen that the particulates were bonded in a relatively uniform distribution to individual exposed surfaces of the filaments. The sodium polyacrylate particulates adhered tightly to the individual exposed surfaces. The sintered material was not washed because sodium polyacrylate is superabsorbent and would interact with water.

Figure 7:
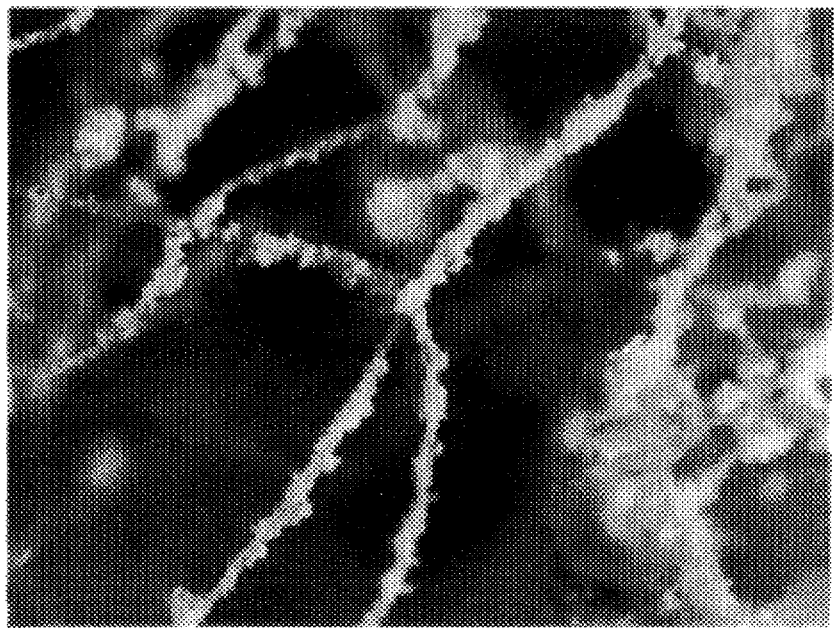
FIG. 7 is a microphotograph of an exemplary fibrous composite structure composed of a matrix of fibrous material having exposed surfaces and a relatively uniform distribution of particulates upon the exposed surfaces.

Referring now to FIG. 7, there is shown a 51× (linear magnification) microphotograph of an exemplary fibrous composite structure composed of a matrix of fibrous material having exposed surfaces and a relatively uniform distribution of particulates upon the exposed surfaces. FIG. 7 is a microphotograph of the material in Table 4 identified as "Sample 13". More particularly, FIG. 7 shows a matrix of bicomponent spunbond filaments. The matrix was electrically charged and sodium aluminosilicate particulates having an average size ranging from about 1 micron to about 5 microns were applied to the matrix utilizing a fluidized bed. The particulates adhered to charged sites at a relatively uniform distribution on individual exposed surfaces of the filaments. The matrix containing adhered sodium aluminosilicate particulates was sintered to cause a low melting-point component of the bicomponent spunbond filaments to fuse with the sodium aluminosilicate. It could be seen that the particulates were bonded in a relatively uniform distribution to individual exposed surfaces of the filaments. The sodium aluminosilicate particulates adhered tightly to the individual exposed surfaces.

Figure 8:
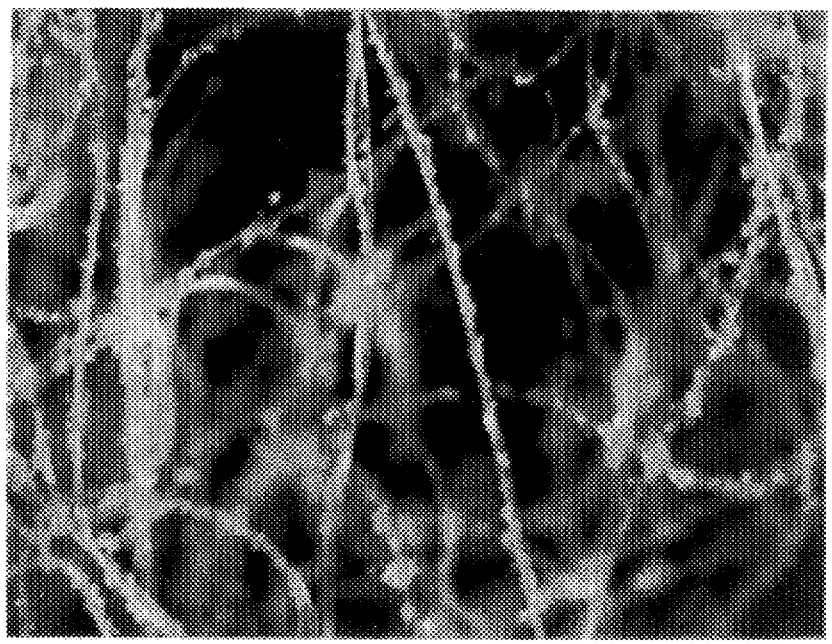
FIG. 8 is a microphotograph of an exemplary fibrous composite structure composed of a matrix of fibrous material having exposed surfaces and a relatively uniform distribution of particulates upon the exposed surfaces, prior to sintering.

Referring now to FIG. 8, there is shown a 51× (linear magnification) microphotograph of an exemplary fibrous composite structure composed of a matrix of fibrous material having exposed surfaces and a relatively uniform distribution of particulates upon the exposed surfaces. FIG. 8 is a microphotograph of the material in Table 3 identified as "Sample 19" prior to sintering. More particularly, FIG. 8 shows a matrix of bicomponent spunbond filaments. The matrix was electrically charged and polyester particulates having an average size ranging from about 100 microns to about 200 microns were applied to the matrix utilizing a fluidized bed. The particulates adhered to charged sites at a relatively uniform distribution on individual exposed surfaces of the filaments.

Figure 9:
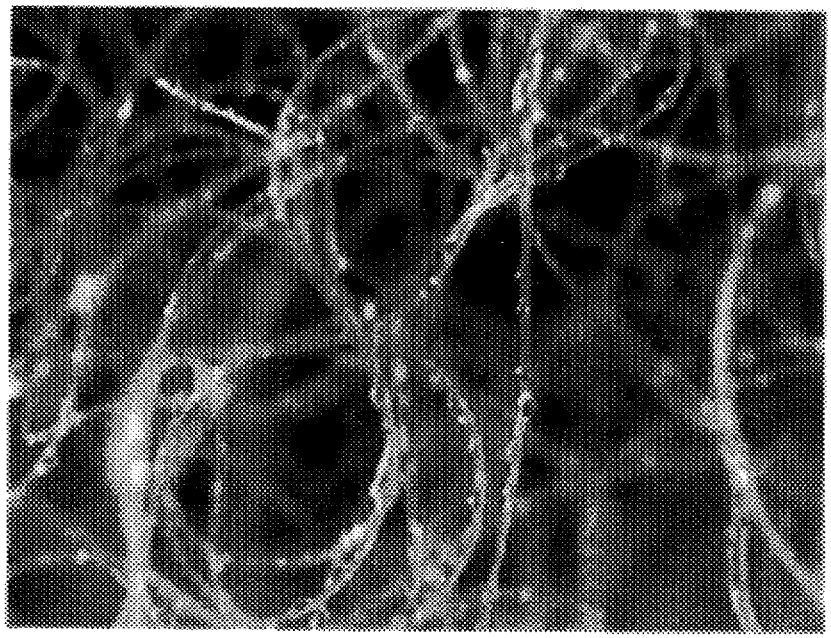
FIG. 9 is a microphotograph of the material shown in FIG. 8 after sintering.

FIG. 9 is a microphotograph that shows the same material (at 51× linear magnification) after sintering and washing. The matrix containing the adhered polyester particulates was sintered. The polyester melted before the low melting-point component of the bicomponent spunbond filaments began to soften. The melted polyester coated the filaments and/or formed droplets. The matrix containing the polyester "coating" and "droplets" was washed by dipping in water three times. After washing, it could be seen that the "coating" and "droplets" were bonded in a relatively uniform distribution to individual exposed surfaces of the filaments. The polyester "coating" and/or "droplets" adhered tightly to the individual exposed surfaces.

Figure 10:
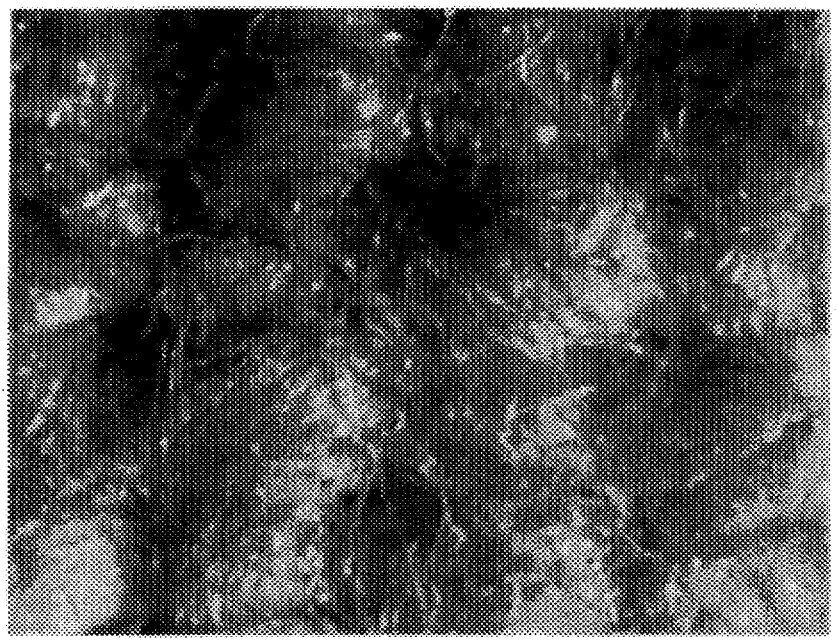
FIG. 10 is a microphotograph of one side of an exemplary fibrous composite structure composed of a matrix of fibrous material.

Referring now to FIG. 10, there is shown a 51× (linear magnification) microphotograph of a matrix of fibrous material having exposed surfaces. FIG. 10 is a microphotograph of the material in Table 6 identified as "Sample 5". More particularly, FIG. 10 shows one side of a woven cotton duck cloth (i.e., the particulate free side). An external electrical field was applied to the non-dielectric cotton cloth using electrodes as previously described. Polyethylene particulates having an average size of about 10 microns to about 30 microns were applied to the cloth utilizing a fluidized bed. The cloth substantially blocked the path of the particulates. No particles adhered to the surface shown in FIG. 10.

Figure 11:
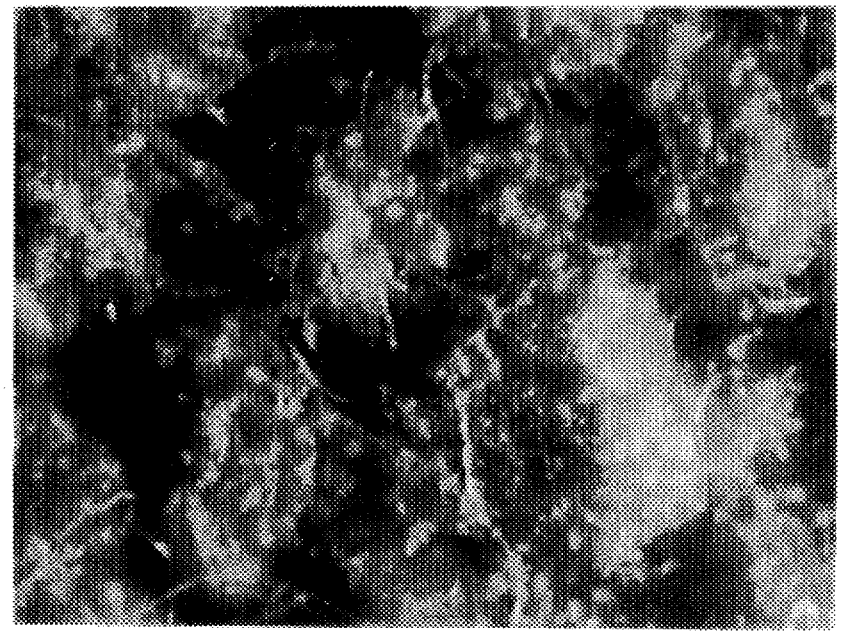
FIG. 11 is a microphotograph of the opposite side of the exemplary fibrous composite structure of FIG. 10 showing a matrix of fibrous material having exposed surfaces and a relatively uniform distribution of particulates upon the exposed surfaces prior to sintering.
Figure 12:
FIG. 12 is a microphotograph of the material shown in FIG. 11 after sintering,.

FIG. 11 is a microphotograph (at 51 × linear magnification) showing the side of the cotton fabric of FIG. 10 that had adhered polyethylene particulates. FIG. 12 is a microphotograph (at 128× linear magnification) showing the particulate exposed side of the cotton fabric as depicted in FIG. 11 after sintering. It can be seen that the polyethylene has melted and is distributed on individual fibers in the cotton fabric.

Figure 13:
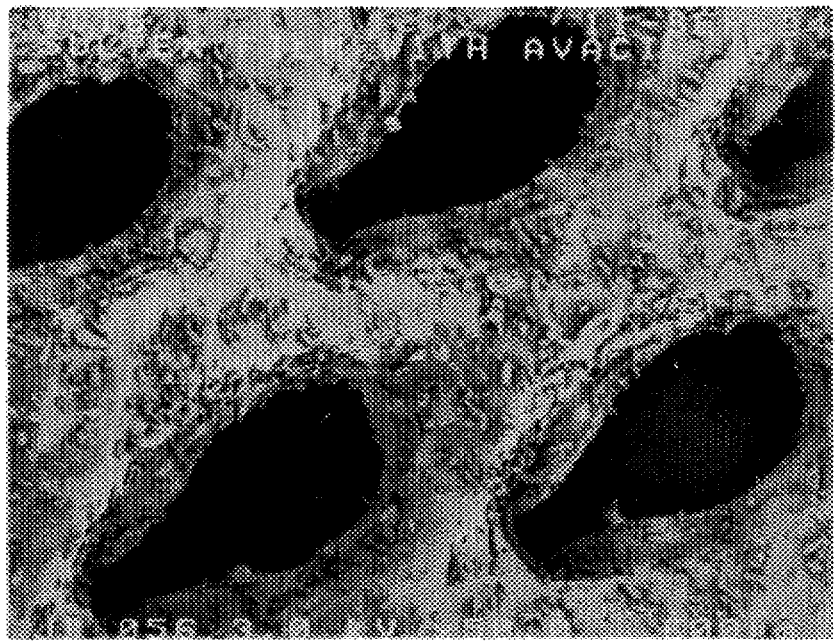
FIG. 13 is a microphotograph of an exemplary film-like composite structure composed of an apertured film-like material having exposed surfaces and a relatively uniform distribution of particulates upon the exposed surfaces.
Figure 14:
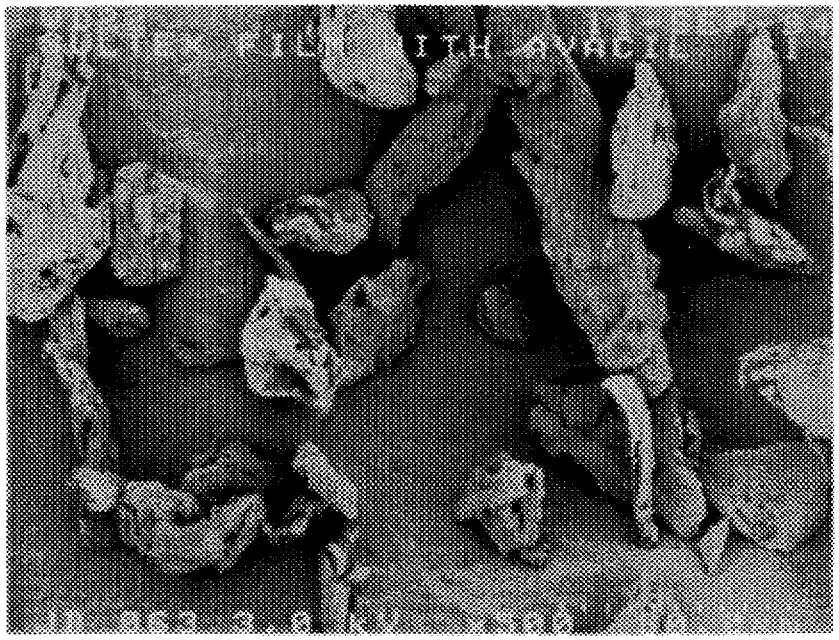
FIG. 14 is a more detailed view of the film-like composite structure depicted in FIG. 13.
Figure 15:
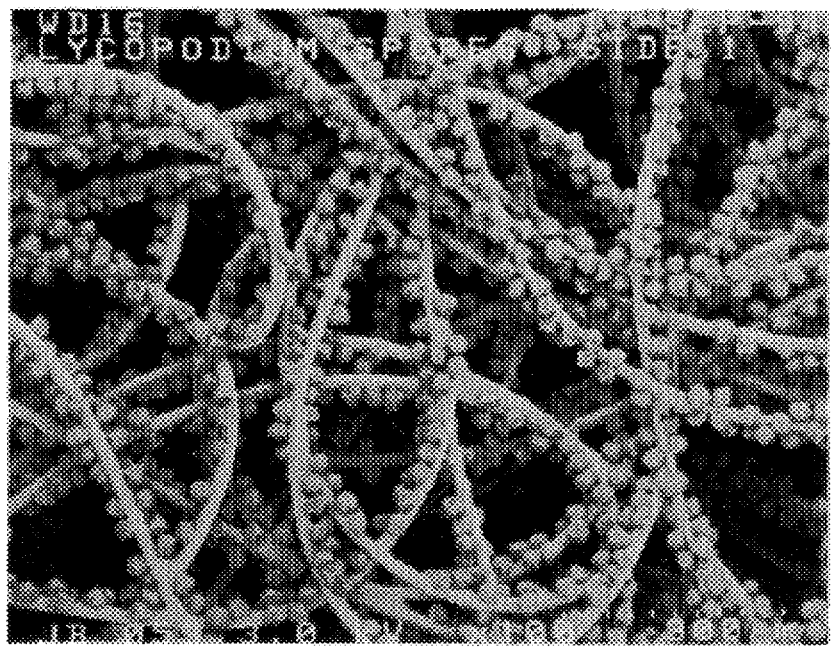
FIG. 15 is a microphotograph of an exemplary fibrous composite structure composed of a matrix of fibrous material having exposed surfaces and a relatively uniform distribution of particulates upon the exposed surfaces.

Referring now to FIG. 13, there is shown a 50× (linear magnification) field emission electron microphotograph (Hitachi S4500) of an exemplary film-like composite structure composed of an apertured film-like material having exposed surfaces and a relatively uniform distribution of particulates upon the exposed surfaces. FIG. 13 is a microphotograph of the material in Table 5 identified as "Sample 11". More particularly, FIG. 13 shows view of the top of an apertured film-like material (available under the trade designation SULTEX from Pantex S.r.l. of Pistola, Italy). The matrix was electrically charged and cellulose particulates having an average size of about 200 microns were applied to the side of the film visible in the microphotograph utilizing a fluidized bed. The particulates adhered to charged sites at a relatively uniform distribution on individual exposed surfaces of the apertured film-like material. FIG. 14 is a 500× (linear magnification) view of the material shown in FIG. 13. Individual cellulose particulates can be seen on the surface of apertured film-like material. The cellulose particulates adhered tightly to the individual exposed surfaces of the matrix. Referring now to FIG. 15, there is shown a 100× (linear magnification) field emission scanning electron microphotograph (Hitachi S4500) of an exemplary fibrous composite structure composed of a matrix of fibrous material having exposed surfaces and a relatively uniform distribution of particulates upon the exposed surfaces. FIG. 15 is a microphotograph of the material in Table 3 identified as "Sample 33". More particularly, FIG. 15 shows a matrix of bicomponent spunbond filaments. The matrix was electrically charged. Lycopodium spores having a relatively positive charge and an average size of about 30 microns were applied to the matrix utilizing a fluidized bed. The particulates adhered to charged sites at a relatively uniform distribution on individual exposed surfaces of the filaments. The matrix containing adhered Lycopodium spores was sintered to cause a low melting-point component of the bicomponent spunbond filaments to fuse with the Lycopodium spores. It appears from the concentration of positively charged Lycopodium spored on the surfaces of individual filaments shown in FIG. 15 that the uncoated portions of individual exposed filaments may have a relatively positive charge and other coated portions have a relatively negative charge.

Figure 16:
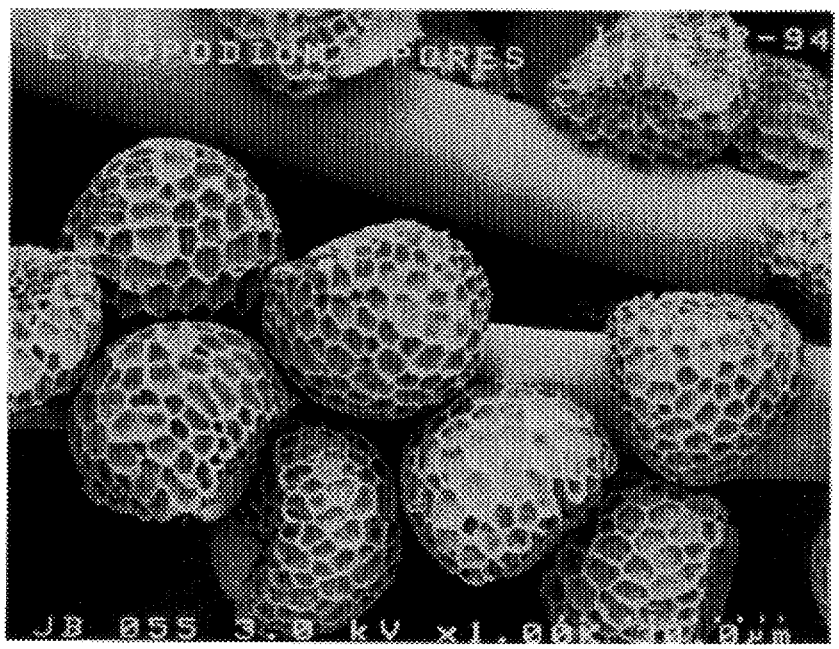
FIG. 16 is a more detailed view of the fibrous composite structure depicted in FIG. 15.

FIG. 16 is a 1000× (linear magnification) view of the material shown in FIG. 15. Individual Lycopodium spores can be seen on the surface of individual filaments after sintering. At the top right hand side of FIG. 16 one Lycopodium spore is clearly fused into the surface of the filament. The positively charged Lycopodium spores adhered tightly to the individual exposed surfaces of the matrix.

EXAMPLES

Various permeable materials were electrically charged and exposed to a variety of particulate materials in order to produce a relatively uniform distribution of particulate materials on individual exposed surfaces of the permeable materials. The particular procedure used to electrically charge the permeable materials depended on whether or not the permeable materials were dielectric.

Method 1

If the material was a dielectric, a charge was applied so that an electret was formed utilizing conventional electret techniques or the method and apparatus described in FIG. 1. Generally speaking, the desired technique involves application of high voltage electric fields via direct current (i.e., DC) to form an electret and is described in U.S. patent application Ser. No. 07/958,958 filed Oct. 9, 1992, which is assigned to the University of Tennessee, previously incorporated by reference.

Particulates were applied to the electret material utilizing a fluidization chamber 16 that was formed of a Plexiglas® cylinder having an inside diameter of about 2 inches. Primary gas supply 18 and boost gas supply 20 was dried compressed air that was metered utilizing a variable air flowmeter 1–9.0 SCFM air series FL-73 from Omega Engineering, Inc., of Stamford, Conn. The primary gas supply 18, boost gas supply 20 (if any) were used to form a suspension of particulates in a moving gas stream that was regulated by a flow amplifier 22 (Transvector model 903 flow amplifier from the Vortec Corporation of Cincinnati, Ohio). A static eliminator power unit (7.5 kVAC—Simco Company, Inc., of Hatfield, Penn.) was connected between the electrode 26 and the grounded flow amplifier 22. The electrical charge applied to the permeable material and/or the particulates was generated by an electrostatic generator (+or–7 kVDC) from the Chapman Company of Portland, Me. The air pressure on each side of the permeable material being treated was monitored by two Magnehelic® differential pressure gages (0–1.0 inch $H_2O$) from Dwyer instruments, Inc., of Michigan City, Ind. In some experimental setups, the air pressure of the gas stream just below the flow amplifier was monitored by a Magnehelic® differential pressure gage (0–30.0 inch $H_2O$). Once the gas stream containing entrained particulates passed through the permeable material, it entered a filter trap 28 (Fine Dust Filter Kit #2W708 from W. W. Grainger, Inc., of Roswell, Ga.).

Method 2

If the permeable material to be electrically charged was non-dielectric (e.g., cotton or any cellulose material), the procedure described above (i.e., Method 1) was used except that a constant charge was applied to the sample to be treated. In particular, the section to be treated was placed at the top of chamber 1C in the sample holder. A brass ring ("◻") 32 was placed on top of the sample 24 and an extension or lead of the ring connected to an electrostatic generator (Chapman #80755, Chapman Corporation, Portland, Me.). A voltage potential was applied throughout the period that the gas-entrained particulates were exposed or contacted with the sample so that the non-dielectric material had a constant charge of about 7.0 kVDC in reference to the flexible ground 30. The charge could be +or–, depending on the solid employed. However, unlike the samples of permeable material that were dielectric, these non-dielectric samples could have only one surface charge.

Procedure

All experimental conditions and results listed in Tables 3, 4, 5, and 6 were carried out as follows except where noted in the Tables. Each sample listed in Tables 1–5 was electreted either by conventional techniques or using Method 1. The samples listed in Table 6 were charged using Method 2.

The particulate material to be fluidized was placed on the screen at the bottom of chamber 16 shown in FIG. 1. If a voltage was applied to the particulate material, it was done so by an electrode 24 located in the side of the chamber 16.

The permeable materials were 4 inch diameter circles of material. The particular area that was treated covered only a 2 inch diameter circle. The 4 inch diameter samples were weighed and the weight of the 2 inch diameter portion was determined by multiplying the weight (of the 4 inch diameter circle) by 0.25. Each sample was placed in the sample holder at the top of chamber 16 in FIG. 1.

The particulates were fluidized by dry air and allowed to contact and/or pass through the permeable material. The primary fluidizing air flow and the boost flow, if any, was reported in standard cubic feet per minute (SCFM). Pressure across the sample was monitored and reported in inches of water. Fluidized particulates were allowed to contact the permeable material and accumulate until the pressure drop across the permeable material increased to about 0.25 inches of $H_2O$ unless otherwise noted in the Tables. Excess particulates were trapped for disposal. The treated materials were weighed and the weight of the solid on the web was reported.

Some of the treated materials were sintered at 125° to 130° C. for four (4) minutes in a circulating air oven. Some of these sintered materials were washed by dipping three times into a beaker of water and air dried. Sintered and/or washed materials are identified in the Tables.

The particulate materials fluidized in these experiments are described in detail in Table 1 under the heading "Solid Material". In general, the particulate material is identified in the Tables as "Solid". The permeable materials used are described in Table 2 under the heading "Web Type". In general, the permeable materials are identified in the Tables as "Web".

Table 3 lists the experimental details and results of applying organic particulate solids onto fibrous web substrates. Table 4 lists the experimental details and results of applying inorganic particulate solids to fibrous web substrates. Table 5 lists the experimental details and results of applying cellulose particulate solids to fibrous web substrates. Table 6 lists the experimental details and results of applying particulate solids to non-dielectric fibrous substrates.

It should be noted that for a few samples, the weight of solid on the web prior to sintering and washing is reported to be less than the weight of solid on the web after sintering and washing. This can be attributed primarily to experimental error.

Samples 29–32 in Table 3 contained polyvinyl alcohol particulates. The samples were sprayed with water just prior to being sintered at 150° C. for five minutes to cross-link the polyvinyl alcohol. These examples show that the non-transient bonding of the particulates can be carried out by chemical reaction.

Recharging of Samples

Several permeable dielectric materials were electrically charged in accordance with Method 1 described above. The electrically charged materials were exposed to particulates as described above to generate a relatively uniform distribution of particulate materials on individual exposed surfaces of the permeable materials. The materials were sintered and washed. Samples prepared in this way were then recharged (or re-electreted) to produce an electret so that another layer of the same or different particulates could be attached to the permeable material.

Presence of an electret was determined by measuring the filtration efficiency of the control sample (after sintering and washing) and an identical sample which was recharged (or re-electreted).

Filtration efficiency for 0.1 micron (μm) NaCl was determined using a Certitest 8110 particle capture tester available from TSI Inc., of St. Paul, Minn. The velocity of air flow across the face of each sample was 15 liters per minute. The pressure drop across each sample during operation of the Certitest equipment was about 0.04 inches of water.

The experimental procedure and results are reported in Table 7. As can be seen from Table 7, recharging a matrix of fibrous material (which is dielectric) significantly improved the filtration efficiency of the material. That improvement in filtration efficiency establishes that the electret properties of the matrix of fibrous material have been restored. Since the matrix is once again an electret, it may be exposed to particulate materials to generate a relatively uniform distribution of particulate materials on individual exposed surfaces which may then be attached by non-transient bonding.

Disclosure of the presently preferred embodiments and examples of the invention are intended to illustrate and not to limit the invention. It is understood that those of skill in the art should be capable of making numerous modifications without departing from the true spirit and scope of the invention.

TABLE 1

Description of Particulates

| Finely Divided Solid Material | Particle Size (μm) | Trade Name | Manufacturer |
|---|---|---|---|
| Starch grafted sodium polyacrylate (Na Polyacrylate) | 50 to 600 | Sanwet IM 5000 | Hoechst Celanese Charlotte, NC |
| Polyvinylidene Fluoride (PF) | 1 to 5 | Kynar 301-F | Atochem North America, Philadelphia, PA |
| Vinylidene Fluoride (VF) Hexafluoropropylene Copolymer | 1 to 5 | Kynar Flex 2801-GL | Atochem North America Philadelphia, PA |
| Polyester | 100 to 200 | 5183A Hot Melt | Bostik Inc. Middleton, MA |
| Polyethylene (PE) | 10 to 30 | A-12 Oxidized Polyethylene | Allied Signal Morristown, NJ |
| Polyvinyl Alcohol (PVOH) | 50 to 200 | Airvol 125 | Air Products Allentown, PA |
| Zinc Oxide (ZnO) | 5 | Photox 80 | The New Jersey Zinc Co. Palmerton, PA |
| Silica | 5 | Tamsil 45 | Unimin Specialty Minerals Inc. Elco, IL |
| Sodium Aluminosilicate (Na Al Silicate) | 1 to 5 | 07342-14A Zeolite | UOP Tarrytown, NY |
| Cellulose | 20 | Avicet PH-105 | FMC Corp. Philadelphia, PA |
| | 50 | PH-101 | |
| | 100 | PH-112 | |
| | 200 | PH-200 | |
| Lycopodium spores | 30 | Lycopodium 62800 | Fluka Chemika AG Buchs, Switzerland |

TABLE 2

Webs Employed in Tables 3–7
Except as indicated otherwise, the following webs were manufactured by the Kimberly-Clark Corporation, Dallas, Texas.

| Web Type | Web Composition |
|---|---|
| 1.2 osy Bico (41 gsm) | Nonwoven web of bicomponent spunbond side-by-side filaments containing 50%, by weight, polypropylene and 50%, by weight, polyethylene. |
| 2.5 osy Meltblown (85 gsm) | Nonwoven web of meltblown polyproplyene fibers & microfibers. |
| 1.25/2.5 osy Spunbond (42/85 gsm) | Nonwoven web of spunbond polypropylene filaments. |
| 3.9 osy Coform (132 gsm) | Nonwoven composite containing 70%, by weight, pulp and 30%, by weight, meltblown polypropylene fibers & microfibers; see U.S. Pat. No. 4,100,324. |
| 1.0 osy SMS (34 gsm) | Nonwoven composite material containing webs of spunbond filaments sandwiching a web of meltblown fibers & microfibers (i.e., spunbond/meltblown/spunbond); see U.S. Pat. No. 4,041,203. |
| Hydroentangled SB/pulp 2.6 osy (90 gsm) | Nonwoven composite material containing 84%, by weight, pulp and 16%, by weight, spunbond polypropylene filaments; See U.S. Pat. No. 5,137,600. |
| Cotton | Cotton duck 10 oz Style 300 available from Trident Industries of Tamarac, Florida. |
| SULTEX 0.63 osy (21 gsm) | Apertured film-like material available from Pantex S.r.l. of Pistola, Italy. (See EP 598 970). |

TABLE 3

ORGANIC SOLIDS ON WEB SUBSTRATE

| Sample# | Solid | Web | Weight of Web g | Fluidizing Flow SCFM | Boost Flow SCFM | Δ P in/H$_2$O | Wt. of Solid On Web g | Sintered | Wash/ Dry | Final Wt. Solid On Web g |
|---|---|---|---|---|---|---|---|---|---|---|
| 1 | Na Polyacrylate | 1.2 osy BICO | 0.115 | 1.0 | 0 | 0.25 | 0.10 | Y | Y | 0.10 |
| 2 | Na Polyacrylate | 1.2 osy BICO | 0.105 | 1.0 | 0 | 0.25 | 0.07 | N | N | 0.07 |
| 3 | Na Polyacrylate | 2.5 osy Meltblown | 0.20 | 0.8 | 0 | 0.25 | 0.03 | Y | N | 0.03 |
| 4 | Na Polyacrylate | 2.5 osy Meltblown | 0.202 | 0.8 | 0 | 0.25 | 0.01 | N | N | 0.01 |
| 5 | Na Polyacrylate | 2.5 osy Spunbond | 0.202 | 0.8 | 0 | 0.25 | 0.04 | Y | N | 0.04 |
| 6 | Na Polyacrylate | 2.5 osy Spunbond | 0.217 | 0.8 | 0 | 0.25 | * | N | N | * |
| 7 | PF | 1.2 osy BICO | 0.12 | 0.8 | 0.5 | 0.25 | 0.06 | Y | N | 0.07 |
| 8 | PF | 1.2 osy BICO | 0.122 | 0.8 | 0.5 | 0.25 | 0.05 | N | Y | 0.04 |
| 9 | PF | 3.9 osy Coform | 0.302 | 0.8 | 0 | 0.25 | 0.02 | Y | N | 0.03 |
| 10 | PF | 3.9 osy Coform | 0.317 | 0.8 | 0 | 0.25 | 0.02 | N | Y | 0.01 |
| 11 | PF | 1.0 osy SMS | 0.105 | 0.5 | 0 | 0.25 | 0.02 | Y | Y | 0.02 |
| 12 | PF | 1.0 osy SMS | 0.11 | 0.5 | 0 | 0.25 | 0.01 | N | Y | * |
| 13 | VF | 1.2 osy BICO | 0.13 | 0.8 | 0 | 0.25 | 0.05 | Y | Y | 0.06 |
| 14 | VF | 1.2 osy BICO | 0.10 | 0.8 | 0 | 0.25 | .06 | N | Y | 0.06 |
| 15 | VF | 2.5 osy Meltblown | 0.20 | 0.5 | 0 | 0.25 | .02 | Y | Y | 0.02 |
| 16 | VF | 2.5 osy Meltblown | 0.20 | 0.5 | 0 | 0.25 | 0.02 | N | Y | * |
| 17 | VF | 2.5 osy Spunbond | 0.182 | 0.5 | 0 | 0.25 | 0.03 | Y | Y | 0.03 |
| 18 | VF | 2.5 osy Spunbond | 0.192 | 0.5 | 0 | 0.25 | 0.04 | N | Y | 0.03 |
| 19 | Polyester | 1.2 osy Bico | 0.115 | 0.8 | 0.5 | 0.25 | 0.09 | Y | Y | 0.10 |
| 20 | Polyester | 1.2 osy Bico | 0.117 | 0.8 | 0.5 | 0.25 | 0.13 | N | Y | 0.10 |
| 21 | Polyester | 3.9 osy Coform | 0.32 | 0.8 | 0 | 0.25 | 0.06 | Y | Y | 0.08 |
| 22 | Polyester | 3.9 osy Coform | 0.309 | 0.8 | 0 | 0.25 | 0.08 | N | Y | 0.07 |
| 23 | Polyester | 1 osy SMS | 0.11 | 0.5 | 0 | 0.25 | 0.03 | Y | N | 0.03 |
| 24 | Polyester | 1 osy SMS | 0.11 | 0.5 | 0 | 0.25 | 0.03 | N | Y | * |
| 25 | PE | 1.2 osy Bico | 0.105 | 1.3 | 0.8 | 0.25 | 0.04 | Y | Y | 0.03 |
| 26 | PE | 1.2 osy Bico | 0.115 | 1.3 | 0.8 | 0.25 | 0.05 | Y | Y | 0.05 |
| 27 | PE | 2.5 osy Meltblown | 0.192 | 0.8 | 0.5 | 0.25 | 0.01 | Y | Y | 0.01 |
| 28 | PE | 2.5 osy Meltblown | 0.177 | 0.8 | 0.5 | 0.25 | 0.01 | Y | Y | 0.01 |
| 29# | PVOH | 2.5 osy Meltblown | 0.16 | 0.5 | 0 | 0.25 | 0.01 | Y | N | 0.01 |
| 30# | PVOH | 2.5 osy Meltblown | 0.202 | 0.5 | 0 | 0.25 | 0.01 | Y | N | 0.01 |
| 31# | PVOH | 1.25 osy Spunbond | 0.085 | 1.0 | 1.0 | 0.30 | 0.02 | Y | N | 0.02 |
| 32# | PVOH | 1.25 osy Spunbond | 0.0432 | 1.0 | 1.0 | 0.30 | 0.30 | Y | N | 0.02 |
| 33 | Lycopodium | 1.2 osy Bico | 0.098 | 1.0 | 0.5 | 0.10 | 0.11 | Y | Y | 0.08 |

These samples were sprayed with water and sintered at 150° C. for 5 minutes to cross-link the polyvinyl alcohol.
*These samples showed no weight increase; however, microphotographs showed the surface coated with particulates.

TABLE 4

INORGANIC SOLIDS ON WEB SUBSTRATE

| Sample# | Solid | Web | Weight of Web g | Fluidizing Flow SCFM | Boost Flow SCFM | Δ P in/H$_2$O | Wt. of Solid On Web | Sintered | Wash/ Dry | Final Wt. on Web g |
|---|---|---|---|---|---|---|---|---|---|---|
| 1 | ZnO | 1.2 osy Bico | 0.102 | 1.3 | 1.0 | 0.25 | 0.03 | Y | Y | 0.03 |
| 2 | ZnO | 1.2 osy Bico | 0.102 | 1.3 | 1.0 | 0.25 | 0.02 | N | Y | 0.02 |
| 3 | ZnO | 3.9 osy Coform | 0.315 | 1.0 | 0.5 | 0.25 | 0.01 | Y | Y | 0.01 |
| 4 | ZnO | 3.9 osy Coform | 0.31 | 1.0 | 0.5 | 0.25 | 0.01 | N | Y | 0.01 |
| 5 | ZnO | 1 osy SMS | 0.112 | 1.0 | 0.5 | 0.25 | * | Y | Y | * |
| 6 | ZnO | 1 osy SMS | 0.11 | 1.0 | 0.5 | 0.25 | * | N | Y | * |
| 7 | Silica | 1.2 osy Bico | 0.117 | 0.8 | 0.5 | 0.25 | 0.09 | Y | Y | 0.09 |
| 8 | Silica | 1.2 osy Bico | 0.107 | 0.8 | 0.5 | 0.25 | 0.06 | Y | Y | 0.06 |
| 9 | Silica | 2.5 osy Meltblown | 0.197 | 0.5 | 0 | 0.25 | 0.03 | Y | Y | 0.01 |
| 10 | Silica | 2.5 osy Meltblown | 0.197 | 0.5 | 0 | 0.25 | 0.07 | Y | Y | 0.05 |
| 11 | Silica | 2.5 osy Meltblown | 0.197 | 0.5 | 0 | 0.25 | 0.07 | Y | Y | 0.05 |
| 12 | Silica | 2.5 osy Spunbond | 0.202 | 0.8 | 0 | 0.25 | 0.04 | Y | Y | 0.02 |
| 13 | Na Al Silicate | 6 osy Bico Silicate | 0.477 | 1.5 | 1.0 | 1.0 | 0.27 | Y | N | 0.27 |

*See footnote on Table 3

TABLE 5

CELLULOSE ON WEB SUBSTRATE

| Sample# | Solid | Web | Weight of Web g | Fluidizing Flow SCFM | Boost Flow SCFM | Δ P in/H$_2$O | Wt. of Solid On Web | Sintered | Wash/ Dry | Final Wt. on Web g |
|---|---|---|---|---|---|---|---|---|---|---|
| 1 | Cellulose 20 | 1.2 osy Bico | 0.117 | 0.8 | 0 | 0.25 | 0.10 | N | Y | 0.09 |
| 2 | Cellulose 20 | 1.2 osy Bico | 0.120 | 0.8 | 0 | 0.25 | 0.08 | Y | Y | 0.08 |
| 3 | Cellulose 50 | 1.2 osy Bico | 0.115 | 0.8 | 0.5 | 0.15 | 0.06 | N | Y | 0.06 |

TABLE 5-continued

CELLULOSE ON WEB SUBSTRATE

| Sample# | Solid | Web | Weight of Web g | Fluidizing Flow SCFM | Boost Flow SCFM | ΔP in/H₂O | Wt. of Solid On Web | Sintered | Wash/ Dry | Final Wt. on Web g |
|---|---|---|---|---|---|---|---|---|---|---|
| 4 | Cellulose 50 | 1.2 osy Bico | 0.117 | 0.8 | 0.5 | 0.25 | 0.17 | Y | Y | 0.14 |
| 5 | Cellulose 100 | 1.2 osy Bico | 0.107 | 0.8 | 0.5 | 0.25 | 0.13 | N | Y | 0.08 |
| 6 | Cellulose 100 | 1.2 osy Bico | 0.097 | 0.8 | 0.5 | 0.25 | 0.14 | Y | Y | 0.14 |
| 7* | Cellulose 100 | 1.2 osy Bico | 0.122 | 0.8 | 0.5 | 0.25 | 0.12 | N | Y | 0.06 |
| 8 | Cellulose 200 | 1.2 osy Bico | 0.127 | 1.0 | 0.5 | 0.15 | | Y | Y | 0.07 |
| 9 | Cellulose 200 | 1.2 osy Bico | 0.11 | 1.0 | 0.5 | 0.25 | | N | Y | 0.07 |
| 10 | Cellulose 200 | 2.5 osy Meltblown | 0.127 | 0.5 | 0 | 0.25 | 0.02 | Y | Y | 0.01 |
| 11 | Cellulose 200 | Sultex | 0.045 | 0.5 | 0.5 | + | 0.03 | N | N | — |

*Sample was not charged (electreted)
+ P was negligible due to the porosity of the film. Flow was maintained for ~30 seconds.
* See footnote on Table 3

TABLE 6

WEBS CHARGED IN PLACE

| Sample# | Solid | Web | Weight of Web g | Fluidizing Flow SCFM | Boost Flow SCFM | ΔP in/H₂O | Wt. of Solid On Web | Sinter | Wash/ Dry | Final Wt. Solid On Web g |
|---|---|---|---|---|---|---|---|---|---|---|
| 1 | PE | Hydroentangled SB/pulp | 0.315 | 1.0 | 0.5 | 0.45 | 0.03 | Y | N | 0.03 |
| 2 | PE | Hydroentangled SB/pulp | 0.315 | 1.0 | 0.5 | 0.45 | 0.03 | Y | N | 0.03 |
| 3* | PE | Cotton | 0.695 | — | — | — | 0.02 | Y | N | 0.01 |
| 4* | PE | Cotton | 0.682 | — | — | — | 0.01 | Y | N | 0.02 |
| 5* | PE | Cotton | 0.680 | — | — | — | # | Y | N | # |

*Due to the nature of the cloth, the solid could not be fluidized through the sample. The pre-charge voltage was turned on to charge the particulate material as well as charging the web in place. The fluidizing air produced a cloud of particulates. Photos showed material had penetrated the web and distributed.
There was no weight change in this sample. See photograph for solid distribution.

TABLE 7

RECHARGING OF SAMPLES

| Sample# | Solid | Web | Weight of Web g | Fluidizing Flow SCFM | Boost Flow SCFM | ΔP in/H₂O | Wt. of Solid On Web | Sinter | Wash/ Dry | Final Wt. on Web g |
|---|---|---|---|---|---|---|---|---|---|---|
| 1 | Polyester | 1.2 osy Bico | 0.107 | 0.8 | 0.5 | 0.25 | 0.09 | Y | Y | 0.09 |
| 2 | Polyester | 1.2 osy Bico | 0.112 | 0.8 | 0.5 | 0.25 | 0.11 | Y | ·Y | 0.11 |

Sample #1 was tested in a Certitest 8110 (TSI Inc., St. Paul, Minn.) and showed a penetration of 0.1 μm NaCl of 90.7%.
Sample #2 was reelectreted and tested as #1 and showed a 0.1 μm NaCl penetration of 56.0%. The electret properties were restored.

| 1 | Polyethylene | 1.2 osy Bico | 0.112 | 1.3 | 0.8 | 0.25 | 0.6 | Y | Y | 0.6 |
| 2 | Polyethylene | 1.2 osy Bico | 0.117 | 1.3 | 0.8 | 0.25 | 0.8 | Y | Y | 0.8 |

Sample #1 showed a 0.1 μm NaCl penetration of 82.8% as measured above.
Sample #2 was reelectreted and tested for penetration and showed a 0.1 μm NaCl penetration of 53.5%. The electret properties were restored.

| 1 | Polyethylene | 2.5 osy Meltblown | 0.192 | 0.8 | 0.1 | 0.25 | 0.01 | Y | Y | 0.01 |
| 2 | Polyethylene | 2.5 osy Meltblown | 0.177 | 0.8 | 0.5 | 0.25 | 0.01 | Y | Y | 0.01 |
| 3 | Polyethylene | 2.5 osy Meltblown | 0.192 | 0.8 | 0.5 | 0.25 | 0.01 | Y | Y | 0.01 |

Sample #1 showed a 0.1 μm NaCl penetration by TSI measurement of 18.9%.
Samples #2 and #3 were reelectreted and showed 0.1 μm NaCl penetrations of 3.59% and 5.87% respectively. The electret properties of #2 and #3 were restored.

What is claimed is:

1. A fibrous composite structure comprising:
   a matrix of fibrous material having individual exposed surfaces; and
   a relatively uniform distribution of particulate material attached to individual exposed surfaces of the fibrous material by substantially non-transient bonding, the relatively uniform distribution of particulate material generally corresponding to a substantially uniform distribution of charged sites present at individual exposed surfaces during attachment of the particulate material.

2. The fibrous composite structure of claim 1, wherein the matrix of fibrous material is selected from woven fabrics, knit fabrics and nonwoven fabrics.

3. The fibrous composite structure of claim 2, wherein the nonwoven fabric is selected from nonwoven webs of meltblown fibers, nonwoven webs of continuous spunbonded filaments, and bonded carded webs.

4. The fibrous composite structure of claim 1, wherein the matrix of fibrous material further includes one or more secondary materials.

5. The fibrous composite structure of claim 3, wherein the nonwoven web of meltblown fibers further includes one or more secondary materials selected from the group consisting of textile fibers, wood pulp fibers, particulates and superabsorbent materials.

6. The fibrous composite structure of claim 1, wherein the fibrous material is selected from thermoplastic polymer fibers and thermoplastic polymer filaments.

7. The fibrous composite structure of claim 6, wherein the thermoplastic polymer comprises a polymer selected from polyolefins, polyamides and polyesters.

8. The fibrous composite structure of claim 7, wherein the polyolefin is selected from polyethylene, polypropylene, polybutene, ethylene copolymers, propylene copolymers, and butene copolymers and blends of the same.

9. The fibrous composite structure of claim 1, wherein at least a portion of the fibrous material is bi-component fibrous material selected from bi-component fibers and bi-component filaments.

10. The fibrous composite structure of claim 1, wherein the particulate material has an average size of from about 0.1 micron to about 400 microns.

11. The fibrous composite structure of claim 10, wherein the particulate material has an average size of from about 0.5 micron to about 200 microns.

12. The fibrous composite structure of claim 1, wherein the particulate material is selected from inorganic solids, organic solids, modified pulps and spores.

13. The fibrous composite structure of claim 12, wherein the inorganic solids are selected from silicas, metals, metal complexes, metal oxides, zeolites and clays.

14. The fibrous composite structure of claim 12, wherein the organic solids are selected from activated carbons, activated charcoals, molecular sieves, polymer microsponges, polyacrylates, polyesters, polyolefins, polyvinyl alcohols, and polyvinylidine halides.

15. The fibrous composite structure of claim 12, wherein the modified pulps are selected from microcrystalline cellulose, highly refined cellulose pulp, and bacterial cellulose.

16. The fibrous composite structure of claim 1, wherein the nonwoven composite structure has a basis weight of from about 6 to about 400 grams per square meter.

17. A multilayer material comprising at least two layers of the fibrous composite structure of claim 1.

18. A multilayer material comprising at least one layer of the fibrous composite structure of claim 1 and at least one other layer.

19. The multilayer material of claim 18 wherein the other layer is selected from the group consisting of woven fabrics, knit fabrics, bonded carded webs, continuous spunbond filament webs, meltblown fiber webs, films, apertured film-like materials and combinations thereof.

* * * * *